Jan. 31, 1928.  
J. A. THOMAS  
1,657,907
AUTOMOBILE PILOT HEADLIGHT
Filed Feb. 1, 1926
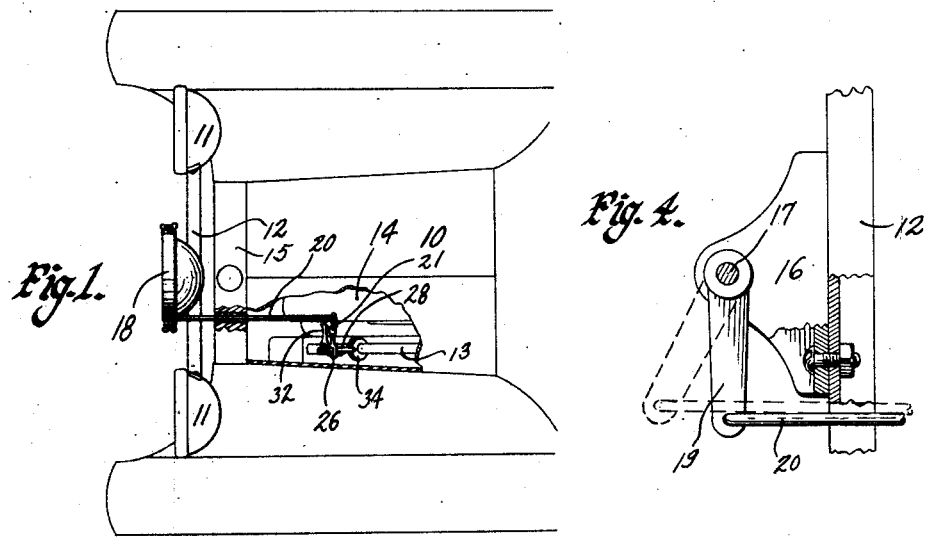
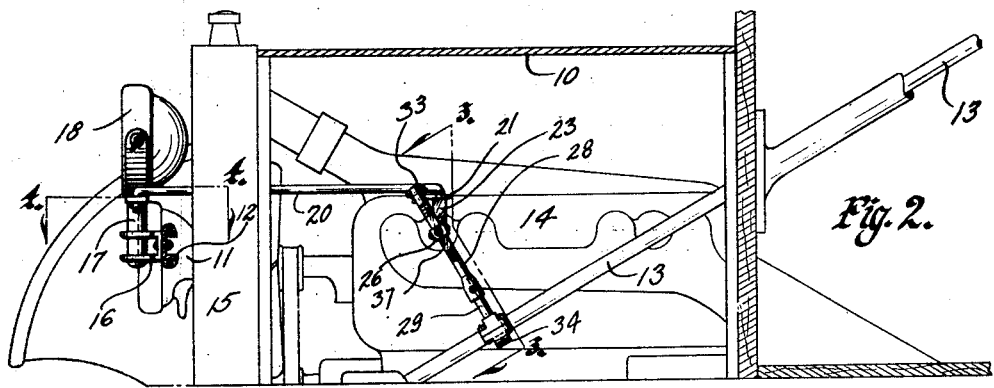
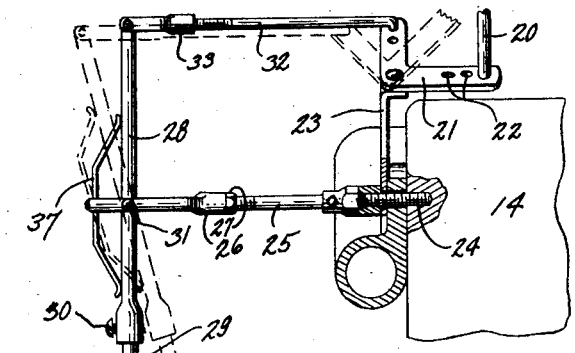
Witness  
L. F. Landberg
Inventor  
James A. Thomas  
by Bair & Freeman Attorneys Patented Jan. 31, 1928.

1,657,907

UNITED STATES PATENT OFFICE.

JAMES ALFRED THOMAS, OF ALBERT LEA, MINNESOTA.

AUTOMOBILE PILOT HEADLIGHT.

Application filed February 1, 1926. Serial No. 85,191.

The object of my invention is to provide a pilot light for automobiles which is simple, durable and of comparatively inexpensive construction.

More particularly my invention relates to a pilot light adapted to be arranged just forwardly of the automobile radiator and between the two ordinary head lights of the automobile and capable of pivotal movement and operated from the steering shaft of the automobile.

Still a further object is to mount a cam or notched member on the steering shaft of an automobile wherein the amount of pivotal movement of the pilot light is controlled by the depth of the notch in the notch member or cam.

Still a further object is to provide a pilot light adapted to throw a light on either side of the road depending upon the particular side that the driver turns and to positively throw the light promptly and to have it turn a predetermined amount regardless of the amount of rotation of the steering shaft itself.

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Figure 1, is a top plan view of a portion of an automobile with my improved pilot light mounted thereon, parts being broken away and shown in section to better illustrate the construction.

Figure 2, is a side view of my pilot light installed upon an automobile.

Figure 3, is a detail sectional view taken on line 3—3 of Figure 2 and

Figure 4, is a detail sectional view taken on line 4—4 of Figure 2.

In the accompanying drawings I have used the reference numeral 10 to indicate generally an automobile having a pair of head lights 11. The headlights 11 are connected together by a cross brace or bar 12 and it is upon this bar that I mount my pilot light.

The automobile 10 includes an ordinary steering post or shaft 13 which is operatively connected to the front wheels of an automobile in the ordinary manner.

The automobile 10 includes the engine block 14 and the radiator 15.

Fixed to the cross brace or bar 12 is a supporting bracket 16. The supporting bracket 16 has a yoke 17 pivotally mounted thereon and mounted in the yoke 17 is the pilot light 18.

The pilot light 18 is fixed relative to the yoke 17 and rotates therewith.

A lever 19 extends from one side of the yoke 17 and has connected to it a rod 20. The rod 20 extends rearwardly through the radiator 15 and has its free end connected to a bell crank lever 21. The bell crank lever 21 is formed with a plurality of openings 22 one of which may receive the rod 20.

The bell crank lever 21 is mounted upon a bracket 23 fixed to the engine 14 by one of the ordinary bolts or by a stud bolt 24.

When a stud bolt 24 is used I mount a supporting arm 25 thereon. The supporting arm 25 is adjustable by means of a socket and screw threaded connecting portion 26.

A lock nut 27 is employed for holding parts of the arm 25 in their extended or adjusted positions.

Pivotally mounted on the arm 25 is a rod 28 having a point member 29 secured to its lower end and held by the set screw 30 and adjustment is thereby obtained for the member 29.

The point member may be of hard steel or may be formed integrally with the rod 28. The rod 28 is pivoted to the arm 25 at 31.

The upper end of the rod 28 is connected to the bell crank lever 21 by a link 32. The link 32 is extensible and adjustable and for this purpose the socket and screw threaded portion 33 are provided.

The link 32 is pivotally connected to the upper end of the rod 28 at one end and to the bell crank lever at its other end.

From the description of the parts just described it will be noted that the arm 25 and bracket 23 support the rod 28 as well as the bell crank lever 21 and link 32.

Secured to the steering post 13 adjacent the lower end of the rod 28 or point 29 is notched member or cam 34. The notched member 34 may be made of a pair of halves and clamped around the steering post 13 and secured into position by bolts or the like 35.

The member 34 is formed with a notch 36 into which extends the point 29 of the rod 28.

The arm 25 extends beyond the pointed connection with the rod 28 and to this extended end is a double acting leaf spring 37.

The spring 37 bears against the rod 28 above and below the pivot point 31 to cause the light 18 to maintain a centered position.

Rotation of the steering shaft 13 in the direction indicated by the arrow 38 will cause the rod 28 to swing on its pivot and assume the position shown in dotted lines in Figure 1 of the drawings.

Movement of the rod 28 will also impart movement to the link 32, the bell crank lever 21 and the rod 20.

Pushing the rod 20 forwardly or pulling it rearwardly will impart swinging or pivotal movement to the pilot light 18.

Movement of the parts to the position shown in dotted lines in Figure 3 of the drawings will cause the rod 20 to push forwardly and this will turn the pilot light so that it throws a light to the right.

The dotted line position of the rod 20 and the yoke 17 is shown in Figure 4 of the drawings.

It will be noted that the notch 36 determines the amount of throw or pivotal movement of the pilot light 18.

If the steering shaft 13 were rotated to position where the notch would come as indicated by the dotted lines 39 in Figure 3, there would be no greater amount of pivotal movement of the pilot light 18 than if the steering shaft 13 were rotated only a quarter turn.

The amount of throw is governed by the notch 36 and since the rod 28 or point 29 are free of the notch 36 any further movement will merely cause the rod 28 to ride upon the periphery of the member 34 not in any way affecting the further movement of the pilot light.

The travel or riding of the arm 28 upon the periphery of the member 34 insures the pilot light to remain in positive turned position as the actual turn of the steering shaft takes place.

In other words, the pilot light is quickly turned and quickly brought back to its original position regardless of the amount of turning or the slowness of turning the steering shaft.

It will be noted that the parts are adjustably connected and that I have shown the parts mounted upon the engine block and in this connection it will be understood that the mounting of the movable parts for connecting the notch member 34 with the pilot light 18 may be changed or mounted in other places depending upon the particular type and make of automobile.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. An automobile pilot light in combination with an automobile comprising a light pivotally mounted, means for rotating said light, said means including a notched member on the steering shaft of the automobile, a bell crank lever, means for connecting one end of the lever with the light and the other end with the notched member whereby rotation of the notched member will impart a predetermined amount of pivotal movement to said light, after which further rotation of the steering shaft will maintain said light in such position.

2. An automobile pilot light comprising a light pivotally mounted, means for rotating said light, said means including a notched member fixed to the steering shaft of the automobile and adapted to rotate therewith, a rod extended into the notch in said notched member, means for connecting said rod with the light, the parts being so arranged that partial rotation of the steering shaft will cause said rod to move out of the notch thereby causing pivotal movement of the light to a predetermined position and further rotation of the steering shaft will maintain said light in such position.

3. In a device of the class described in combination with an automobile, a pilot light pivotally mounted, means of connection between the pilot light and the steering shaft of the automobile, said means including a notched member on the steering shaft, a spring actuated rod pivotally mounted and having one end received in the notched member and the other end operatively connected with said light whereby movement of the notched member will impart movement to said rod for imparting movement to said light, said rod in said notched member determining the amount of pivotal movement of the light, said rod being extensible for varying such amount.

Des Moines, Iowa, December 12, 1925.

JAMES A. THOMAS.